United States Patent
Tokai et al.

(10) Patent No.: US 8,366,579 B2
(45) Date of Patent: Feb. 5, 2013

(54) TRANSMISSION FOR VEHICLE

(75) Inventors: Norihiko Tokai, Toyota (JP); Naoki Kato, Toyota (JP); Hiroki Goshima, Anjo (JP)

(73) Assignees: Toyota Jidosha Kabushiki Kaisha, Aichi-ken (JP); Aisin AW Co., Ltd., Aichi-ken (JP)

( * ) Notice: Subject to any disclaimer, the term of this patent is extended or adjusted under 35 U.S.C. 154(b) by 483 days.

(21) Appl. No.: 12/527,039

(22) PCT Filed: Feb. 13, 2008

(86) PCT No.: PCT/IB2008/000326
§ 371 (c)(1),
(2), (4) Date: Sep. 18, 2009

(87) PCT Pub. No.: WO2008/099268
PCT Pub. Date: Aug. 21, 2008

(65) Prior Publication Data
US 2010/0029430 A1    Feb. 4, 2010

(30) Foreign Application Priority Data
Feb. 14, 2007 (JP) .................................. 2007-033304

(51) Int. Cl.
*F16H 57/04* (2010.01)
(52) U.S. Cl. ........................................ 475/160; 74/606 R
(58) Field of Classification Search .................. 475/160; 74/606 R
See application file for complete search history.

(56) References Cited

U.S. PATENT DOCUMENTS

| | | | |
|---|---|---|---|
| 4,766,773 A | 8/1988 | Yamaguchi et al. | |
| 5,050,447 A * | 9/1991 | Hayakawa et al. | 74/606 R |
| 5,505,112 A | 4/1996 | Gee | |
| 6,299,561 B1 | 10/2001 | Kramer et al. | |
| 7,984,791 B2 * | 7/2011 | Taguchi et al. | 184/6.12 |
| 2005/0107202 A1 | 5/2005 | Min | |
| 2006/0048600 A1 | 3/2006 | Taguchi et al. | |

FOREIGN PATENT DOCUMENTS

| | | |
|---|---|---|
| DE | 1 801 917 A | 5/1970 |
| DE | 44 14 164 A1 | 10/1995 |
| DE | 100 34 561 A1 | 2/2001 |
| JP | 6-159484 A | 6/1994 |
| JP | 2003-35324 A | 2/2003 |
| JP | 2004-36633 A | 2/2004 |

OTHER PUBLICATIONS

German Office Action issued on Dec. 23, 2011 in a counterpart German Patent Application No. DE 11 2008 000 270.3.

* cited by examiner

*Primary Examiner* — David D Le
*Assistant Examiner* — Derek D Knight
(74) *Attorney, Agent, or Firm* — Sughrue Mion, PLLC

(57) ABSTRACT

An automatic transmission includes: a differential mechanism which includes a ring gear; a case which forms a differential chamber that houses the differential mechanism; and an oil pan which is fitted to the case, and which stores oil. The differential chamber includes a first space in which the oil supplied from the oil pan is gathered, and a second space which is formed on the opposite side of the first space with respect to the ring gear in the direction in which the rotational axis of the ring gear extends, and which is communicated with a space inside the oil pan. An oil passage, through which the oil is introduced from the first space to the second space, is formed in the case. The oil passage is formed in a bottom portion of the differential chamber.

6 Claims, 4 Drawing Sheets

TRANSMISSION FOR VEHICLE

BACKGROUND OF THE INVENTION

1. Field of the Invention

The invention relates generally to a transmission for a vehicle, and, more specifically, to a transmission for a vehicle, in which a shifting mechanism and a differential mechanism are integrally provided.

2. Description of the Related Art

A housing of a conventionally-used transmission for a vehicle is described in, for example, Japanese Patent Application Publication No. 2004-36633 (JP-A-2004-36633). With the housing described in JP-A-2004-36633, the amount of lubricating oil in the housing is reduced, the lubricating oil is more appropriately supplied to elements that need lubrication, and resistance, which is caused when, for example, a final gear stirs the oil, is reduced. According to JP-A-2004-36633, a partition provided between a differential chamber and an oil pan chamber separates these chambers from each other. The differential chamber has a bottom portion, and houses a differential unit. The oil pan chamber is communicated with the space inside an oil pan. A through-hole is formed in the partition.

A transmission for a vehicle is described in Japanese Patent Application Publication No. 06-159484 (JP-A-06-159484). According to JP-A-06-159484, an oil strainer is appropriately arranged in a limited space without use of a connecting device. In addition, the oil strainer is easily fitted at an appropriate position in a case without reduction of sealing performance between an oil supply port and the oil strainer.

According to the technology described in JP-A-2004-36633, the oil, which is accumulated at the bottom of the differential chamber, is returned to the oil pan chamber through the through-hole. However, if the viscosity of the oil increases when the temperature of the oil is low and the oil drawn upward adheres to, for example, a wall face of the differential chamber, the amount of the oil which is returned to the oil pan decreases. Under this condition, the air may be sacked into a suction opening of the oil strainer.

SUMMARY OF THE INVENTION

The invention provides a transmission for a vehicle, in which the oil is smoothly returned to an oil pan.

An aspect of the invention is related to a transmission for a vehicle, which includes a differential mechanism, a case, and an oil pan. The differential mechanism includes a ring gear. Drive power from a shifting mechanism is transferred to the differential mechanism via the ring gear. The case forms a differential chamber that houses the differential mechanism. The oil pan is fitted to the case, and stores the oil. The differential chamber includes a first space and a second space. The oil supplied from the oil pan gathers in the first space. The second space is communicated with a space inside the oil pan. The second space is formed on the opposite side of the first space with respect to the ring gear in the direction in which the rotational axis of the ring gear extends. An oil passage, through which the oil is introduced from the first space to the second space, is formed in the case. The oil passage is formed in a bottom portion of the differential chamber.

In the transmission for the vehicle according to the aspect of the invention, because the oil passage is formed in the bottom portion of the differential chamber, it is possible to avoid the situation in which the oil remains accumulated in the first space at a position lower than the oil passage. Thus, it is possible to smoothly introduce the oil from the first space to the second space, and return the oil to the oil pan.

The transmission according to the aspect of the invention may further include a plate that is provided in the differential chamber, and that separates the ring gear and the oil passage from each other. In the thus structured transmission for a vehicle, it is possible to avoid the situation in which the oil that flows through the oil passage is stirred by the rotating ring gear.

In the aspect of the invention, an oil pump which sucks the oil stored in the oil pan may be further provided; and the oil passage may be formed at a position outside the area between the rotational axis of the oil pump and the rotational axis of the ring gear. In the thus structured transmission for a vehicle, formation of the oil passage does not increase the distance between the rotational axis of the oil pump and the rotational axis of the ring gear. Therefore, it is possible to reduce the distance between the rotational axis of the oil pump and the rotational axis of the ring gear. As a result, it is possible to reduce the size of the transmission.

In the aspect of the invention, an oil accumulation portion, which is provided in the first space and which allows the oil to be temporarily accumulated in the differential chamber, may be further provided. The oil passage may be formed at a position lower than the oil accumulation portion. In the thus structured transmission for a vehicle, it is possible to avoid the situation in which the oil remains accumulated in the oil accumulation portion at a position lower than the oil passage.

In the aspect of the invention, the case may include a first part and a second part that are connected to each other with multiple bolts. The first part and the second part may have a joint surface and a joint surface, respectively, which are connected each other when the multiple bolts pass through the joint surfaces. The oil passage may be formed so as to extend between the adjacent bolts included in the multiple bolts and pass through the joint surfaces.

According to the aspect of the invention described above, it is possible to provide a transmission for a vehicle, in which the oil is returned to the oil pan smoothly.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF EMBODIMENT

Figure 1:
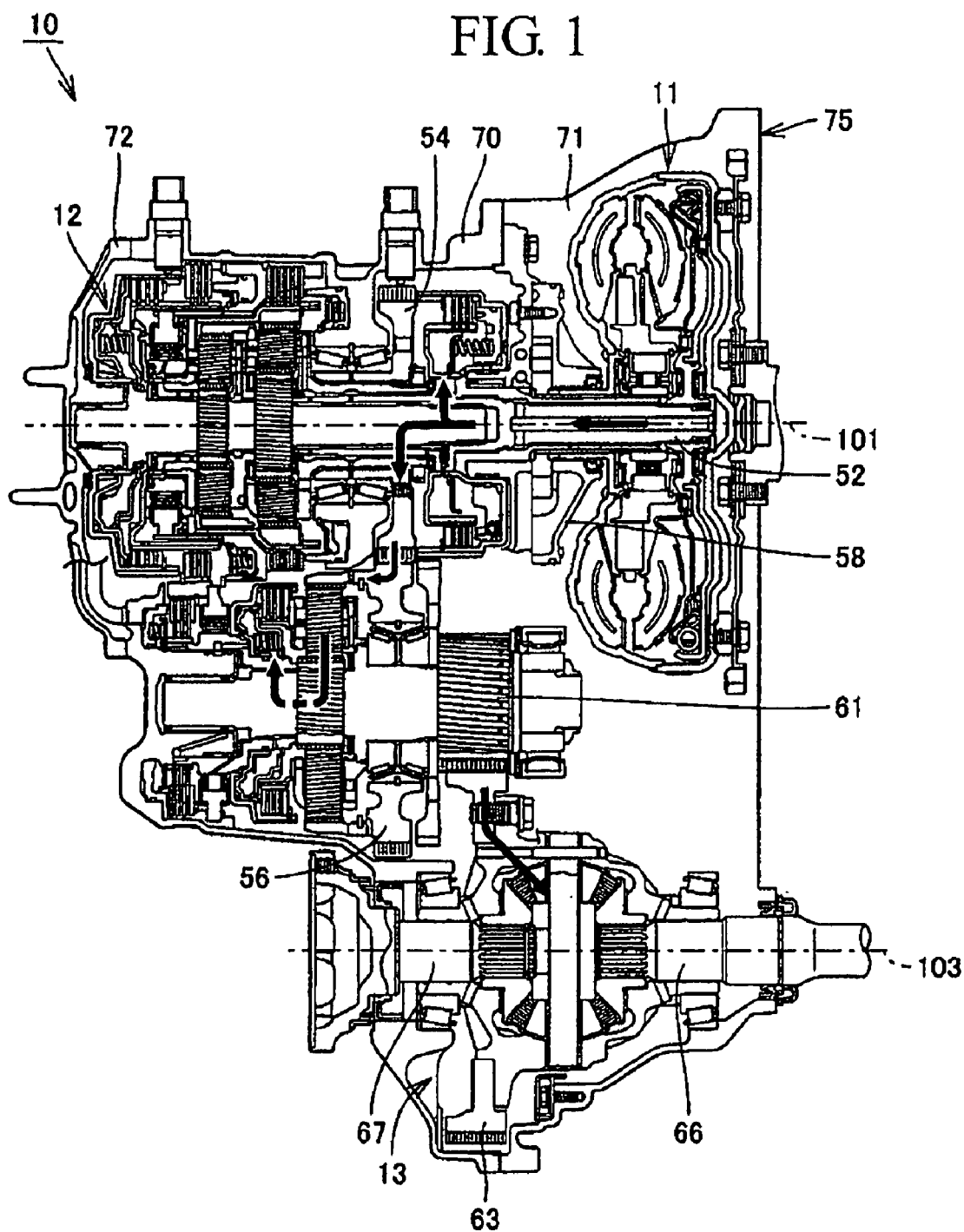
FIG. 1 is a cross-sectional view of an automatic transmission according to an embodiment of the invention.

An embodiment of the invention will be described in detail with reference to the accompanying drawings. Note that, the same reference numerals will be assigned to the same or corresponding components in the drawings.

FIG. 1 is a cross-sectional view of an automatic transmission 10 according to an embodiment of the invention. As shown FIG. 1, the automatic transmission 10 is mounted in a vehicle. The automatic transmission 10 is mounted in a FF (front-engine front-wheel drive) vehicle. In the FF vehicle, an internal combustion engine is provided in the front side of the vehicle, and front wheels are used as drive wheels.

The automatic transmission 10 includes a torque converter 11, a shifting mechanism 12, and a differential mechanism 13. The automatic transmission 10 is a transmission for a vehicle, in which the shifting mechanism 12 and the differential mechanism 13 are integrally provided.

The torque converter 11 transfers the drive power from the engine to the shifting mechanism 12 by using the flow of the oil in the torque converter 11. The shifting mechanism 12 transfers the rotation from the torque converter 11 to the differential mechanism 13 while decreasing or increasing the rotational speed or changing the direction of the rotation. The differential mechanism 13, which receives the power from the shifting mechanism 12, transfers drive power equally to the drive wheels while changing the rotational speed between the right and left drive wheels when the vehicle is making a turn.

The shifting mechanism 12 is formed by combining multiple-plate clutches, multiple-plate brakes, and multiple planetary gear sets together. Each of the multiple-disc clutch and the multiple-disc brake includes multiple discs, and each planetary gear set includes a sun gear, pinions, and a ring gear. The shifting mechanism 12 includes an input shaft 52, a counter drive gear 54, a counter driven gear 56, and a differential drive pinion 61.

The input shaft 52 extends in the direction in which a central axis 101 of the shifting mechanism 12, which is a virtual axial, extends. The counter drive gear 54 is provided on the central axis 101 of the shifting mechanism 12. The counter driven gear 56 is meshed with the counter drive gear 54. The differential drive pinion 61 is provided coaxially with the counter driven gear 56.

The differential mechanism 13 includes a ring gear 63. The ring gear 63 is provided on a central axis 103 of the differential mechanism 13, which is a virtual axial. The input shaft 52 and the ring gear 63 are provided on the different axes which are apart from each other. The central axis 101 of the shifting mechanism 12 and the central axis 103 of the differential mechanism 13 are parallel with each other. The ring gear 63 rotates on the central axis 103. The ring gear 63 is meshed with the differential drive pinion 61. The drive power from the shifting mechanism 12 is transferred to the differential mechanism 13 via the ring gear 63.

Figure 2:
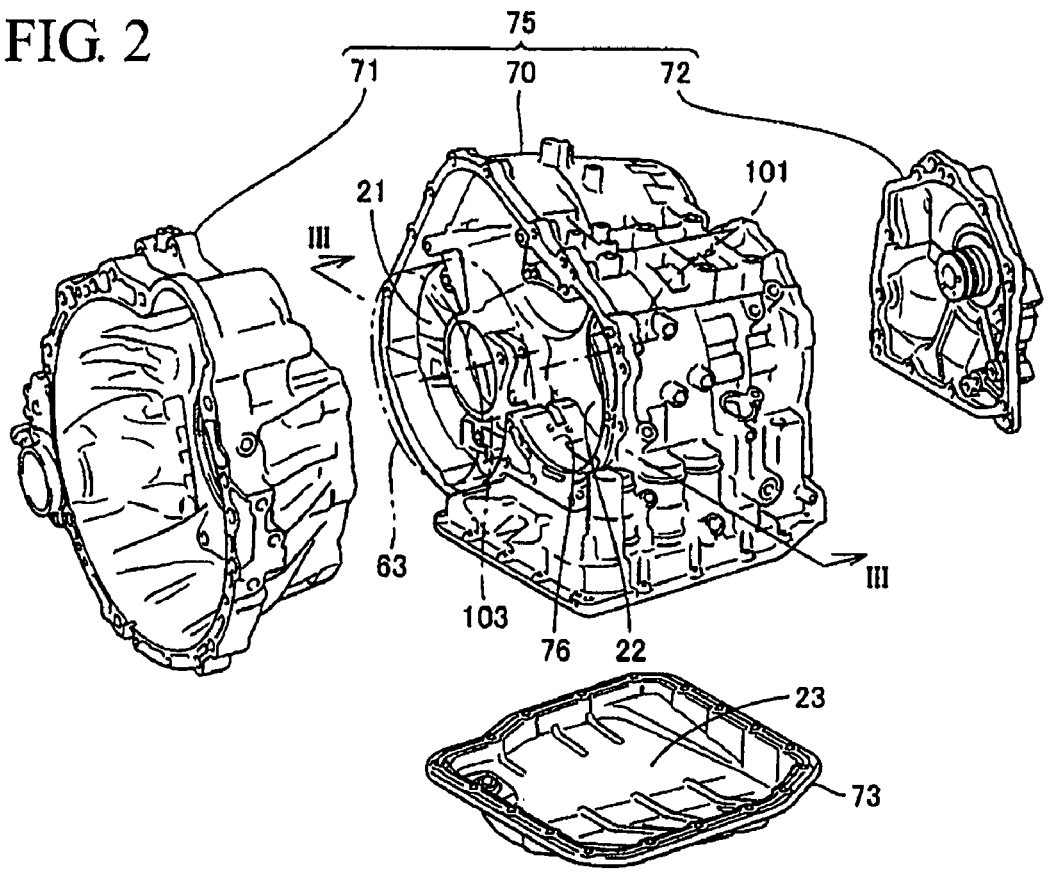
FIG. 2 is an exploded view of a case that forms the automatic transmission in FIG. 1.

FIG. 2 is an exploded view of a case 75 that forms the automatic transmission in FIG. 1. As shown in FIG. 1 and FIG. 2, the transmission 10 includes the case 75. The torque converter 11, the shifting mechanism 12 and the differential mechanism 13 are housed in the case 75. The case 75 forms the appearance configuration of the automatic transmission 10.

The case 75 includes a transaxle housing 71 that serves as a first case, a transaxle case 70 that serves as a second case, and a transaxle rear cover 72. The transaxle housing 71 is provided on the engine side of the transaxle case 70. The transaxle rear cover is provided on the opposite side of the transaxle case 70. The torque converter 11 is housed in the transaxle housing 71.

The transmission 10 is provided with an oil pan 73. The oil pan 73 is shaped like a tray. The oil is stored in the oil pan 73. The oil is called the automatic transmission fluid (ATF). The clutch is engaged and disengaged by controlling the hydraulic pressure of the oil. The torque converter 11 transfers the drive power using the oil flow. In addition, the oil serves as the lubricating oil that prevents seizure between mechanical elements such as gears.

The automatic transmission 10 includes an oil pump 58. The oil pump 58 is provided on the central axis 101. The oil pump 58 sucks the oil stored in the oil pan 73, and delivers the oil to various elements of the automatic transmission 10. The oil pump 58 rotates on the central axis 101 in accordance with the rotation of the input shaft 52. Thus, the oil pump 58 is driven. The oil pump 58 is a gear pump.

Figure 3:
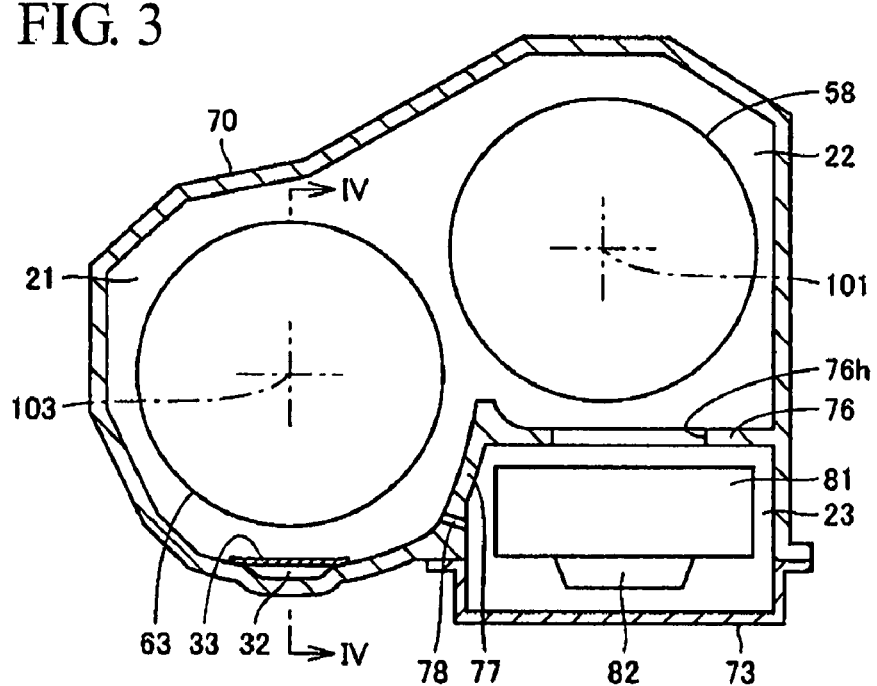
FIG. 3 is a cross-sectional view of the automatic transmission taken along the line III-III in FIG. 2.

FIG. 3 is a cross-sectional view of the automatic transmission taken along the line III-III in FIG. 2. As shown in FIG. 2 and FIG. 3, the transaxle housing 71 and the transaxle case 70 are connected with each other. The transaxle housing 71 and the transaxle case 70 are connected with each other with bolts (not shown).

A differential chamber 21 and a transmission chamber 22 are formed by the transaxle housing 71 and the transaxle case 70. The differential chamber 21 and the transmission chamber 22 are adjacent to each other on a plane that is perpendicular to the direction in which the central axis 101 and the central axis 103 extend. The differential chamber 21 and the transmission chamber 22 are communicated with each other. The differential mechanism 13 is provided in the differential chamber 21. The ring gear 63 is provided in the differential chamber 21. The shifting mechanism 12 and the oil pump 58 are provided in the transmission chamber 22. The bottom of the differential chamber 21 is formed at a position lower than the bottom of the transmission chamber 22.

A valve body chamber 23 is formed by the transaxle case 70 and the oil pan 73. A valve body 81 and an oil strainer 82 are provided in the valve body chamber 23. A solenoid valve, which controls the hydraulic pressure of the oil to be supplied from the oil pan 73 to the mechanical elements of the transmission, is embedded in the valve body 81. The oil strainer 82 is fixed at a position between the valve body 81 and the oil pan 73. The oil strainer 82 is arranged so as to face the oil pan 73. The oil strainer 82 removes extraneous material from the oil that is supplied from the oil pan 73 to the valve body 81.

The transaxle case 70 includes partitions 76 and 77. The partition 76 separates the transmission chamber 22 and the valve body chamber 23 from each other. An opening 76h, through which the oil supplied to the shifting mechanism 12 is returned to the oil pan 73, is formed in the partition 76. The partition 77 separates the differential chamber 21 and the valve body chamber 23 from each other. An oil passage 78 is formed in the partition wall 77. The oil passage 78 is formed of a hole which passes through the partition 77. The oil passage 78 provides communication between the differential chamber 21 and the valve body chamber 23.

Figure 4:
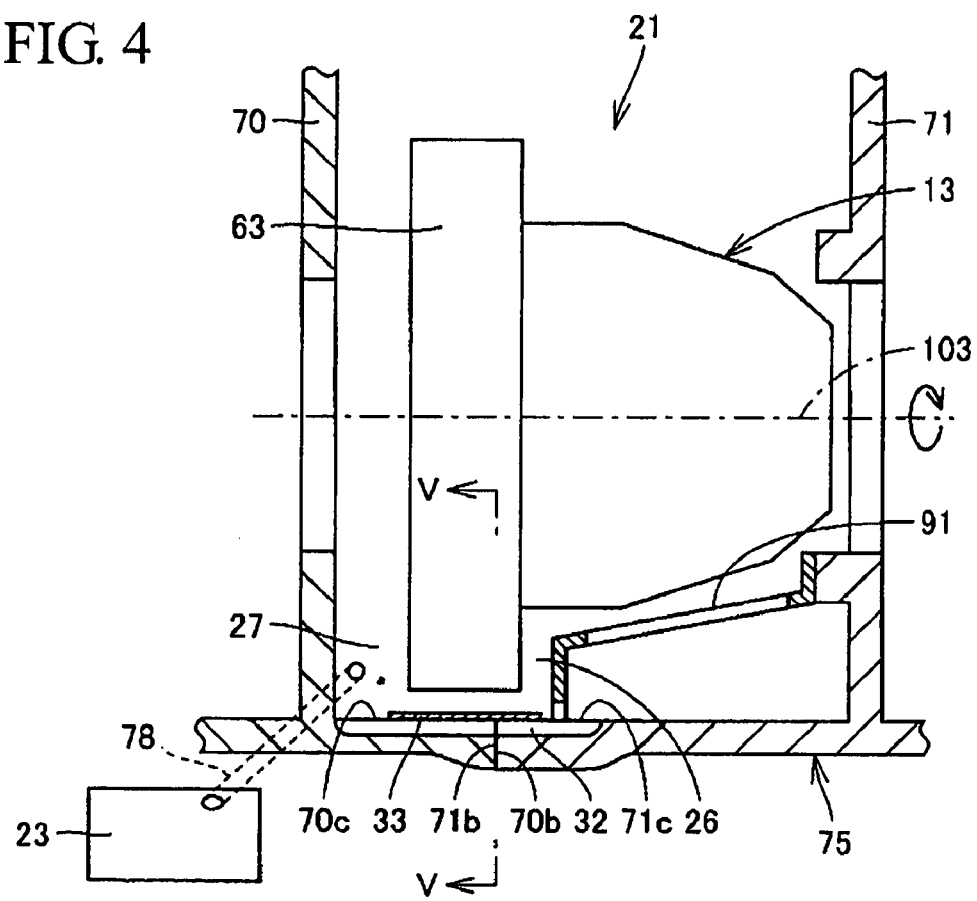
FIG. 4 is a cross-sectional view of the automatic transmission taken along the line IV-IV in FIG. 3.

FIG. 4 is a cross-sectional view of the automatic transmission taken along the line IV-IV line in FIG. 3. As shown in FIG. 3 and FIG. 4, the ring gear 63 is provided at a position close to a bottom face 71c of the transaxle housing 71 and a bottom face 70c of the transaxle case 70 with some space left between the ring gear 63 and the bottom faces 71c and 70c. The differential chamber 21 includes a first space 26 and a second space 27. The ring gear 63 separates the first space 26 and the second space 27 from each other. In the direction in which the central axis 103 extends, the first space 26 is formed on one side of the ring gear 63, and the second space is formed on the other side of the ring gear 63. The first space 26 is formed in the transaxle housing 71. The second space is formed in the transaxle case 70. The oil passage 78 provides communication between the second space 27 and the valve body 23.

The oil supplied to the differential chamber 21 is accumulated in the first space 26. The automatic transmission 10 includes an oil accumulation portion 91. The oil accumulation portion 91 is formed in the first space 26. The oil accumulation portion 91 is formed in the transaxle housing 71. The oil accumulation portion 91 is shaped like a box in which the oil is accumulated. The oil accumulation portion 91 is formed at the bottom of the case 75. The oil accumulation portion 91 is formed on the bottom face 71c of the transaxle housing 71. The oil accumulation portion 91 allows the oil to be temporarily accumulated in the first space 26. Therefore, it is possible to avoid the situation in which a large amount of oil gathered in the differential chamber 21 is stirred by the ring gear 63 when the oil temperature is high.

An oil passage 32 is formed in the case 75. The oil passage 32 is formed at the bottom of the case 75. The oil passage 32 is formed at a position lower than the ring gear 63. The oil passage 32 is formed at a position lower than the oil accumulation portion 91. The oil passage 32 is formed directly below the ring gear 63. The oil passage 32 is formed at the lowest position in the differential chamber 21.

The oil passage 32 is formed in the transaxle case 70 and the transaxle housing 71. The oil passage 32 extends in the direction in which the central axis 103 extends. The oil passage 32 extends from the first space 26 to the second space 27. When the automatic transmission 10 is seen from above, the oil passage 32 overlaps with the first space 26, the ring gear 63, and the second space 27. The oil passage 32 is a recess formed in both the bottom face 71c of the transaxle housing 71 and the bottom face 70c of the transaxle case 70. The oil passage 32 is shaped like a groove. The oil passage 32 has an opening that opens toward the ring gear 63. The shape of the oil passage 32 is not limited to a groove shape. The oil passage 32 may be a hole that extends from the first space 26 to the second space 27.

The oil gathered in the first space 26 and accumulated in the oil accumulation portion 91 moves from the first space 26 to the second space 27 through the oil passage 32.

Under this circumstance, if the oil passage 32 is formed at the side of the ring gear 63, the oil remains accumulated in the oil accumulation portion 91 at a position lower than the oil passage 32. In contrast, according to the embodiment of the invention, the oil passage 32 is formed at the bottom of the case 75. In addition, the oil passage 32 is formed at a position lower than the oil accumulation portion 91. Therefore, the oil is not unnecessarily accumulated in the oil accumulation portion 91, and the oil gathered in the first space 26 is introduced to the second space 27 through the oil passage 32.

Then, the oil introduced to the first space 26 is returned to the oil pan 73 through the oil passage 78.

The automatic transmission 10 includes a plate 33. The plate 33 is provided over the oil passage 32. The plate 33 is provided immediately below the ring gear 63. The plate 33 separates the ring gear 63 and the oil passage 32 from each other. With this structure, it is possible to avoid the situation in which the oil that flows through the oil passage 32 is stirred by the rotating ring gear 63. Thus, it is possible to suppress bubbling of the oil, and to prevent the oil from squirting out of a breather that is formed in the case 75.

Figure 5:
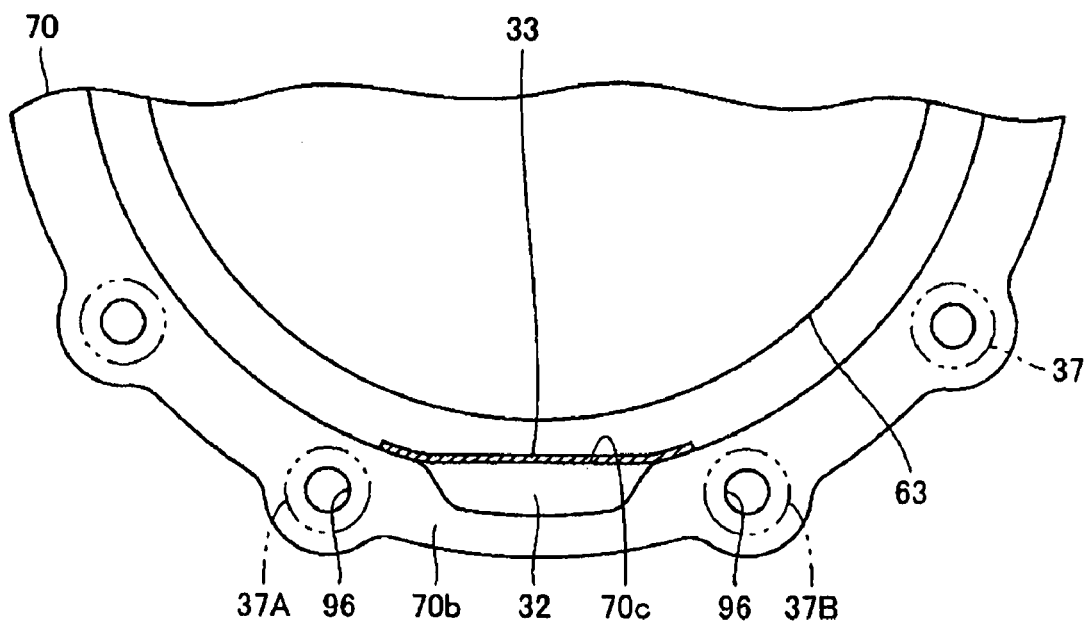
FIG. 5 is an end view of a transaxle case taken along the line V-V in FIG. 4.

FIG. 5 is an end view of the transaxle case taken along the line V-V in FIG. 4. In FIG. 4 and FIG. 5, the transaxle case 70 and the transaxle housing 71 are connected with each other with multiple bolts 37.

The transaxle case 70 has a joint surface 70b, and the transaxle housing case 71 has a joint surface 71b. The joint surface 70b and the joint surface 71b face each other, and the joint surface 70b and the joint surface 71 are connected to each other with the multiple bolts 76. Multiple internal threads 96 are formed in the transaxle case 70. The internal threads 96 open at the joint surface 70b. The bolts 37 screw together the internal threads 96. The bolts 37 are arranged so as to pass through the joint surface 70b and the joint surface 71b.

The oil passage 32 passes through the joint surface 70b and the joint surface 71b. The oil passage is formed between adjacent bolts 37A and 37B included in the multiple bolts 37. With this structure, it is possible to form the oil passage 32 without changing the shape of the case 75.

Figure 6:
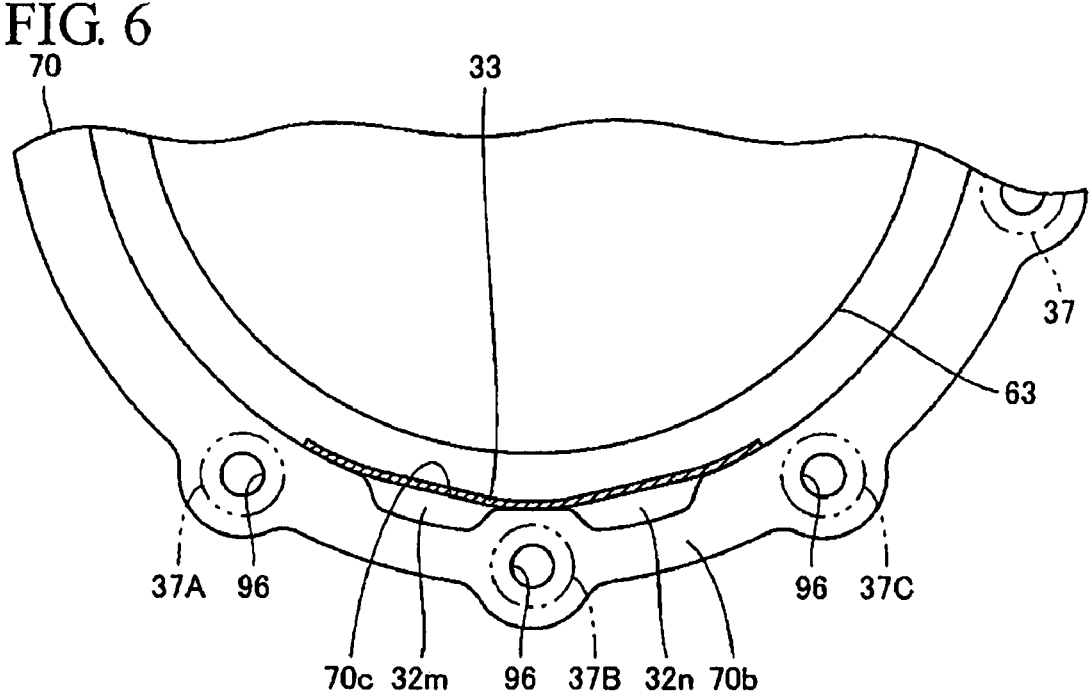
FIG. 6 is an end view of the transaxle case having an oil passage that is different in shape from an oil passage in FIG. 5.

FIG. 6 is an end view of a transaxle case 70 having an oil passage that is different in shape from the oil passage 32 in FIG. 5. As shown in FIG. 6, multiple oil passages, that is, an oil passage 32m and an oil passage 32n, are formed in the case 75. The oil passages 32m and 32n are formed with a certain distance kept therebetween in the circumferential direction around the central axis 103. The oil passage 32m is formed between the adjacent bolts 37A and 37B included in the multiple bolts 37. The oil passage 32n is formed between adjacent bolts 37B and 37C included in the multiple bolts 37.

Figure 7:
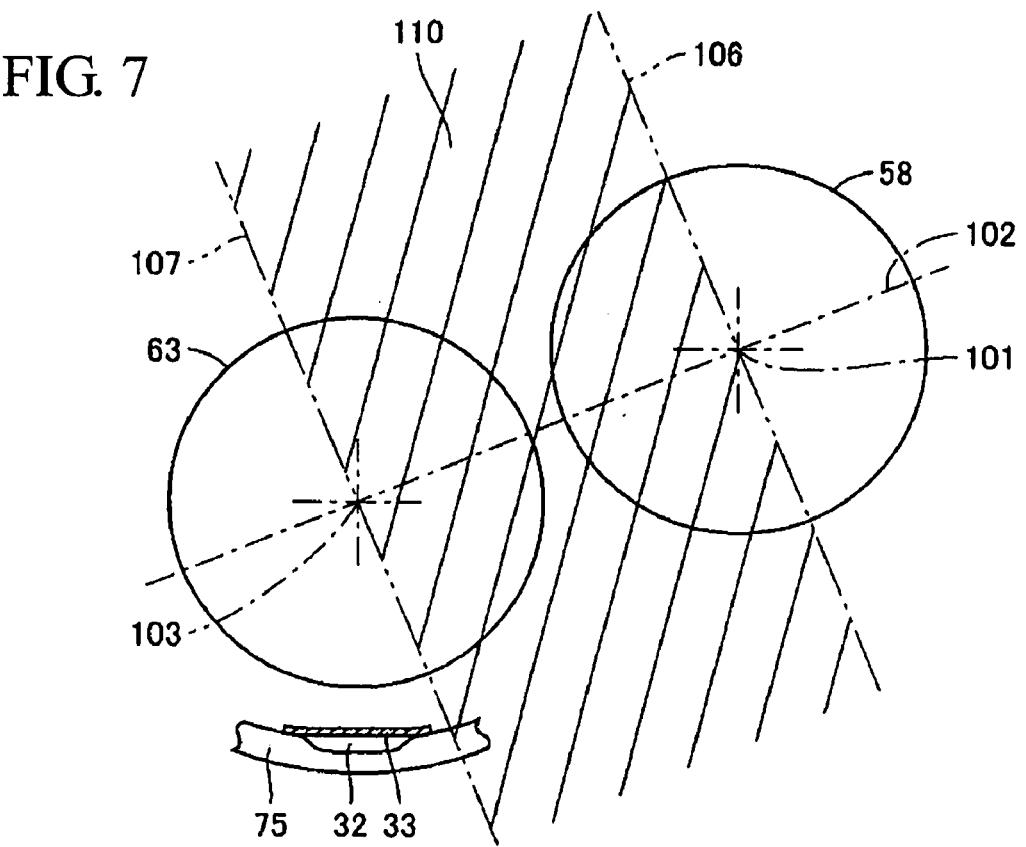
FIG. 7 is an elevation view of the transmission, which illustrates the positional relationship among an oil pump, a ring gear, and the oil passage in FIG. 3.

FIG. 7 is an elevation view of the transmission, which illustrates the positional relationship among the oil pump 58, the ring gear 63, and the oil passage 32 in FIG. 3. As shown in FIG. 7, the oil passage 32 is formed outside the area between the rotational axis of the ring gear 63 and the rotational axis of the oil pump 58.

A line 102, which passes through the central axis 101 and the central axis 103, is defined. A line 106, which is at the right angles to the line 102 and which passes through the central axis 101, is defined. A line 107, which is at the right angles to the line 102 and which passes through the central axis 103, is defined. Under this condition, the oil passage 32 is formed outside of an area 110 between the line 106 and the line 107.

With this structure, formation of the oil passage 32 does not increase the distance between the rotational axis of the ring gear 63 and the rotational axis of the oil pump 58. Accordingly, it is possible to decrease the distance between the axis of the shifting mechanism 12 and the axis of the differential mechanism 13. Thus, it is possible to reduce the size of the automatic transmission 10.

The automatic transmission 10 according to the embodiment of the invention includes the differential mechanism 13, the case 75, and the oil pan 73. The differential mechanism 13 includes the ring gear 63. The drive power from the shifting mechanism 12 is transmitted to the differential mechanism 13 via the ring gear 63. The case 75 forms the differential chamber 21 which houses the differential mechanism 13. The oil pan 73 is provided in the case 75, and stores the oil. The differential chamber 21 includes the first space 26 and the second space 27. The oil supplied from the oil pan 73 is gathered in the differential chamber 21. The second space 27 is formed on the opposite side of the first space with respect to the ring gear 63 in the direction in which the rotational axis of the ring gear 63 extends. The second space 27 is communicated with the space inside the oil pan 73. The oil passage 32, through which the oil is introduced from the first space 26 to the second space 27, is formed in the case 75. The oil passage 32 is formed at the bottom of the differential chamber 21.

With the thus structured automatic transmission 10 according to the embodiment of the invention, it is possible to return the oil, supplied to the differential chamber 21, to the oil pan 73 smoothly. When the oil temperature is low, the oil adheres to, for example, the wall face of case 75. Accordingly, the amount of the oil which is returned to the oil pan decreases. Even in such a condition, it is possible to prevent the oil strainer 82 from sucking the air by making the flow of the oil from the differential chamber 21 to the oil pan 73 smooth.

In the embodiment of the invention, the invention is applied to the automatic transmission 10. Alternatively, the invention may be applied to a continuously variable transmission.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A transmission for a vehicle, including:
    a differential mechanism which includes a ring gear, and to which power from a shifting mechanism is transferred via the ring gear;
    a case which forms a differential chamber that houses the differential mechanism; and
    an oil pan which is fitted to the case, and which stores oil, characterized in that:
    the differential chamber includes a first space in which the oil supplied from the oil pan is gathered, and a second space which is formed on an opposite side of the first space with respect to the ring gear in a direction in which a rotational axis of the ring gear extends, and which is communicated with a space inside the oil pan;
    an oil passage, through which the oil is introduced from the first space to the second space, is formed in the case; and
    a single plate that is provided in the differential chamber, and that separates the ring gear and the oil passage from each other,
    wherein the oil passage is formed in a bottom portion of the differential chamber,
    wherein the single plate separates the ring gear and the oil passage from each other along the entire width of the ring gear in a direction parallel to the rotational axis of the ring gear, and
    wherein both ends of the single plate in the circumferential direction of the ring gear are affixed to the case at a position where the both ends of the single plate are arranged overlapping with the ring gear in a radial direction of the ring gear.

2. The transmission according to claim 1, characterized in that:
    an oil pump which sucks the oil stored in the oil pan is further provided; and
    the oil passage is formed at a position outside an area between a rotational axis of the oil pump and a rotational axis of the ring gear.

3. The transmission according to claim 1, characterized in that:
    an oil accumulation portion, which is provided in the first space and which allows the oil to be temporarily accumulated in the differential chamber, is further provided; and
    the oil passage is formed at a position lower than the oil accumulation portion.

4. The transmission according to claim 1, characterized in that:
    the case includes a first part and a second part that are connected to each other with multiple bolts;
    the first part having a first joint surface, and the second part having a second joint surface, which are connected to each other when the multiple bolts pass through the joint surfaces; and
    the oil passage is formed so as to extend between adjacent bolts included in the multiple bolts and pass through the joint surfaces.

5. The transmission according to claim 1, characterized in that the oil passage is shaped like a groove.

6. The transmission according to claim 1, characterized in that the oil passage is a hole that extends from the first space to the second space.

* * * * *